United States Patent
Bharali et al.

(10) Patent No.: US 8,938,777 B1
(45) Date of Patent: *Jan. 20, 2015

(54) USING GEOGRAPHICAL INFORMATION IN POLICY ENFORCEMENT

(71) Applicant: Palo Alto Networks, Inc., Santa Clara, CA (US)

(72) Inventors: Anupam Bharali, San Jose, CA (US); Ravi Ithal, Fremont, CA (US); Yueh-Zen Chen, San Jose, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/034,382

(22) Filed: Sep. 23, 2013

Related U.S. Application Data

(63) Continuation of application No. 13/113,936, filed on May 23, 2011, now Pat. No. 8,566,900.

(51) Int. Cl.
*G06F 17/00* (2006.01)
*H04L 29/06* (2006.01)

(52) U.S. Cl.
CPC .................................. H04L 63/107 (2013.01)
USPC ........ 726/1; 726/7; 726/13; 726/23; 713/179; 370/389

(58) Field of Classification Search
CPC .... H04L 63/0236; H04L 9/0872; H04L 63/00
USPC .......... 726/1, 7, 12, 13, 23; 713/193; 709/223
See application file for complete search history.

(56) References Cited

U.S. PATENT DOCUMENTS

| | | | |
|---|---|---|---|
| 7,085,267 B2 * | 8/2006 | Carey et al. | 370/389 |
| 7,263,719 B2 * | 8/2007 | Jemes et al. | 726/12 |
| 7,551,635 B2 * | 6/2009 | Mallya et al. | 370/408 |
| 8,566,900 B1 * | 10/2013 | Bharali et al. | 726/1 |
| 8,584,226 B2 * | 11/2013 | Kudla et al. | 726/13 |
| 8,635,695 B2 * | 1/2014 | Zuk et al. | 726/23 |
| 8,839,425 B1 * | 9/2014 | Martini | 726/22 |
| 2008/0155645 A1 * | 6/2008 | Hutnik et al. | 726/1 |
| 2009/0089859 A1 * | 4/2009 | Cook et al. | 726/3 |
| 2009/0113516 A1 * | 4/2009 | Vorreiter et al. | 726/1 |
| 2010/0031358 A1 * | 2/2010 | Elovici et al. | 726/24 |
| 2010/0100949 A1 * | 4/2010 | Sonwane et al. | 726/7 |
| 2011/0004913 A1 * | 1/2011 | Nagarajan et al. | 726/1 |
| 2013/0117851 A1 * | 5/2013 | Bhagwat et al. | 726/23 |

OTHER PUBLICATIONS

Nurmi D, Eucalyptus Open-source cloud computing system, May 2009, IEEE, vol. 7, pp. 124-131.*

* cited by examiner

*Primary Examiner* — Dede Zecher
*Assistant Examiner* — Viral Lakhia
(74) *Attorney, Agent, or Firm* — Van Pelt, Yi & James LLP

(57) ABSTRACT

Using geographical information in policy enforcement is disclosed. A request for a resource is received from a device. A policy to be applied to the request is determined based at least in part on geographical information associated with an IP address. The policy is enforced. The IP address may be either a source IP address or a destination IP address.

20 Claims, 8 Drawing Sheets

FIG. 3A

| Name | Source Address | Source User | Dest Address | Application | Action |
|---|---|---|---|---|---|
| Block Finance Attack | 62.5.128.4 | ANY | 10.0.0.5 | ANY | DENY |
| Block Finance Attack | 62.16.96.6 | ANY | 10.0.0.5 | ANY | DENY |
| Block Finance Attack | *.ru | ANY | 10.0.0.5 | ANY | DENY |

FIG. 3B

| Name | Source Address | Source User | Dest Address | Application | Action |
|---|---|---|---|---|---|
| Block Russia | Russia | ANY | 10.0.0.5 | ANY | DENY |
| Lab Access | Singapore-Office | ANY | Denver-Lab | ssh-tunnel | ALLOW |
| Block Iranian Mail | Iran | ANY | Mail Server | smtp | DENY |

USING GEOGRAPHICAL INFORMATION IN POLICY ENFORCEMENT

CROSS REFERENCE TO OTHER APPLICATIONS

This application is a continuation of co-pending U.S. patent application Ser. No. 13/113,936, entitled USING GEOGRAPHICAL INFORMATION IN POLICY ENFORCEMENT filed May 23, 2011 which is incorporated herein by reference for all purposes.

BACKGROUND OF THE INVENTION

Firewalls and other security devices typically enforce policies against network transmissions based on a set of rules. In some cases, the rules may be based on a source or destination IP address (e.g., denying access to a particular destination IP address). Unfortunately, defining such rules can be a tedious and error prone process.

BRIEF DESCRIPTION OF THE DRAWINGS

Various embodiments of the invention are disclosed in the following detailed description and the accompanying drawings.

FIG. 3A illustrates a set of example policies.

FIG. 3B illustrates a set of example policies.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications, and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
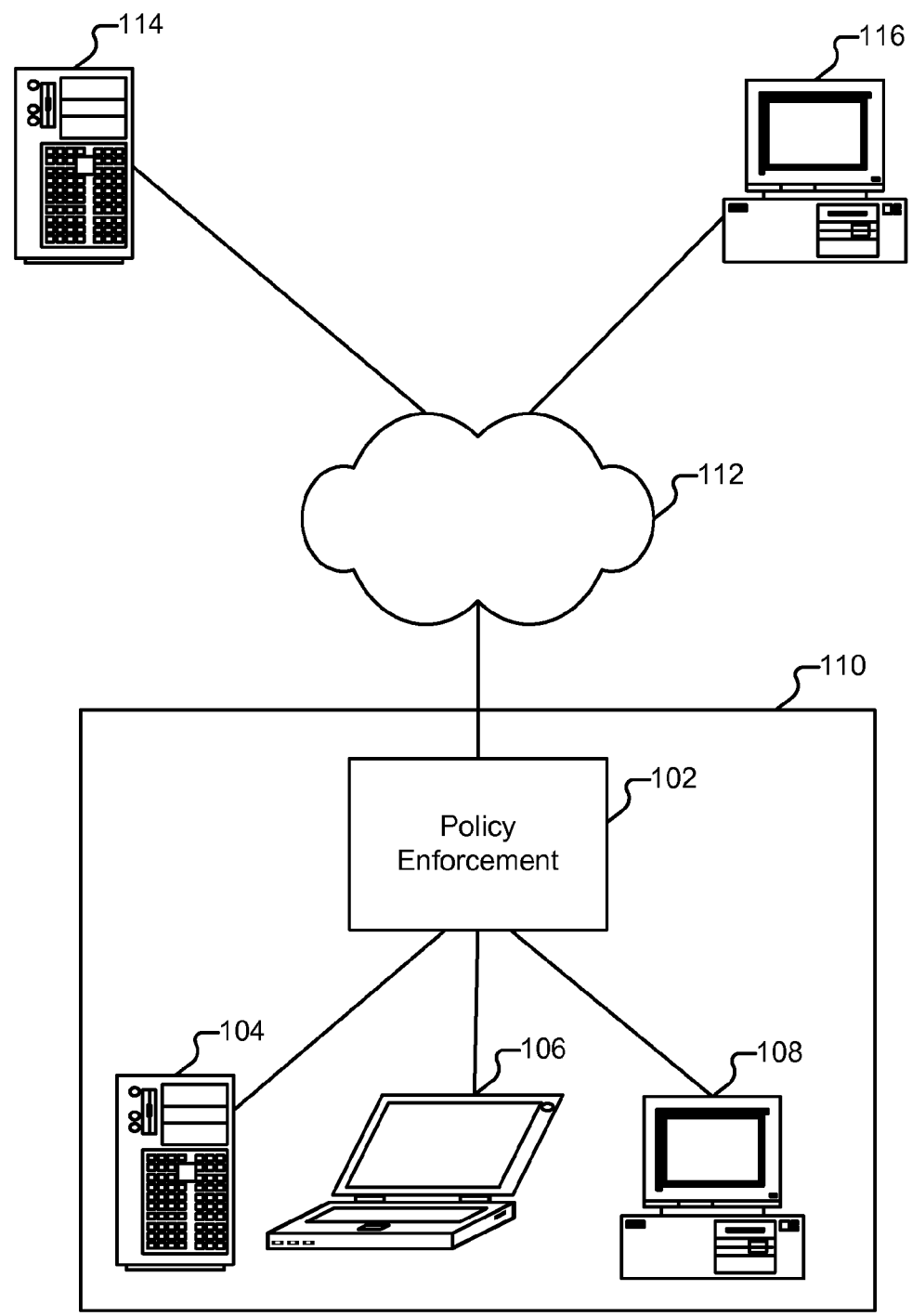
FIG. 1 illustrates an embodiment of an environment in which policies that include geographic information are enforced.

FIG. 1 illustrates an embodiment of an environment in which policies that include geographic information are enforced. In the example shown, devices 104-108 are computers present in an enterprise network 110, belonging to a company, ACME Corporation. Other devices can also be used in conjunction with the environment shown, such as mobile telephony devices, personal digital assistants, gaming consoles, and set-top boxes. Network 110 is subdivided as applicable. For example, ACME Corporation may have multiple physical office locations—a headquarters in Santa Clara, a branch office in Denver, and a branch office in Singapore, each with its own subordinate network or set of subordinate networks. Within a given physical location, the network may also be subdivided, e.g., into a set of nodes all belonging to the finance department. Device 106 is a laptop computer located in the finance department and device 104 is a mail server, both located in ACME's headquarters in Santa Clara. Device 108 is a test system physically located in the Denver office, in an engineering lab.

Policy enforcement appliance 102 (also referred to herein as "appliance 102") is configured to enforce policies regarding communications between devices such as device 104, and nodes outside of enterprise network 110 (e.g., nodes 114-116, reachable via external network 112). One example of a policy is a rule prohibiting any access to any of the nodes in the finance department by computers located in a particular country, such as Russia. Other types of policies can also be enforced, such as ones governing traffic shaping, quality of service, forwarding, or routing of traffic. In some embodiments, policy enforcement appliance 102 is also configured to enforce policies with respect to traffic that stays within enterprise network 110.

The functionality provided by policy enforcement appliance 102 can be implemented in a variety of ways. Specifically, policy enforcement appliance 102 can be a dedicated device or a set of devices. For example, the Denver office may have a separate policy enforcement appliance that is in communication with appliance 102, though it need not have one. The functionality provided by appliance 102 can also be integrated into or executed as software on a general purpose computer, a computer server, a gateway, and/or a network/routing device. Further, whenever appliance 102 is described as performing a task, a single component, a subset of components, or all components of appliance 102 may cooperate to perform the task. Similarly, whenever a component of appliance 102 is described as performing a task, a subcomponent may perform the task and/or the component may perform the task in conjunction with other components. In various embodiments, portions of appliance 102, such as database 328, are provided by one or more third parties. Depending on factors such as the amount of computing resources available to appliance 102, various logical components and/or features of appliance 102 may be omitted, such as update scheduler 330, and the techniques described herein adapted accordingly. Similarly, additional logical components/features can be added to system 102 as applicable.

Figure 2:
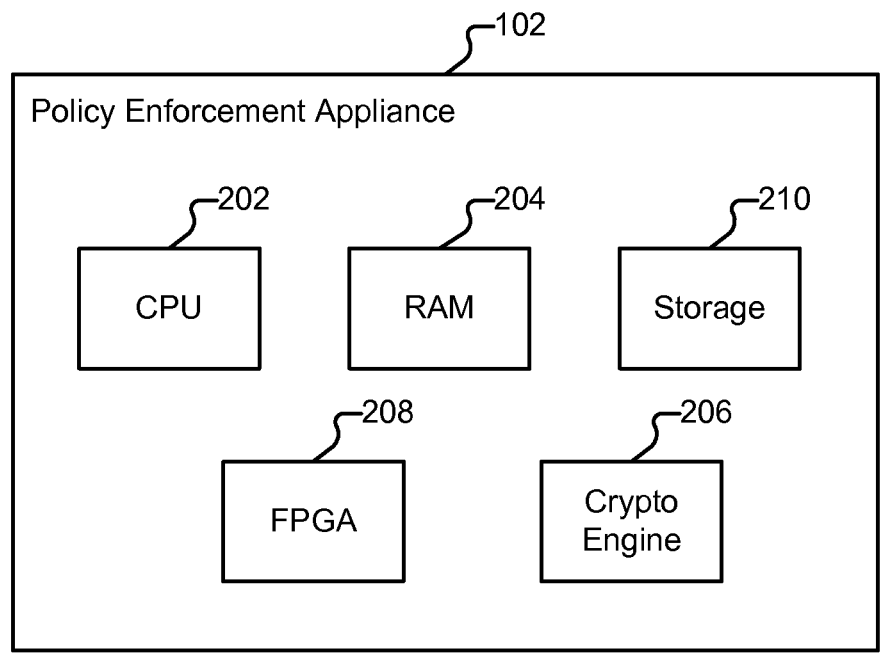
FIG. 2 illustrates an embodiment of a policy enforcement appliance.

FIG. 2 illustrates an embodiment of a policy enforcement appliance. The example shown is a representation of physical components that are included in appliance 102, in some embodiments. Specifically, appliance 102 includes a high performance multi-core CPU 202 and RAM 204. Appliance 102 also includes a storage 210 (such as one or more hard disks), which is used to store policy and other configuration information, as well as geographic information. Data appliance 102 can also include one or more optional hardware accelerators. For example, data appliance 102 can include a cryptographic engine 206 configured to perform encryption and decryption operations, and one or more FPGAs 208 configured to perform matching, act as network processors, and/or perform other tasks.

FIG. 3A illustrates a set of example policies. Included in the policies are a user-supplied name (352), source address (354), source user (356), destination address (358), application (360), and action (362). Other elements can also be included in policies, as applicable, such as source and destination ports. Elements can also be omitted from policies, such as by omitting the source user.

Suppose that that finance department computer 106 (having the IP address 10.0.0.5) has been the subject of attempted attacks by computers 114 and 116, both of which are physically located in Russia. One way to limit future attacks by computers 114 and 116 against computer 106 would be to include rules blocking access to computer 106 by computers 114 and 116 by their IP addresses. An example of these rules is illustrated at 302 in FIG. 3A. One problem with the rules shown at 302 is that if the attackers use a different computer (having different IP addresses) to perform the attacks in the future, the rules shown in FIG. 302 will not prevent the attack. Further, it is likely that an attempted attack on computer 106 would not be mounted by two devices (114 and 116) but instead by a potentially very large number of nodes. Manually specifying each of those IP addresses would be cumbersome, error prone, and potentially impossible.

An alternate way of preventing computers 114 and 116 from accessing computer 106 is through rule 304, which would prevent access to computer 106 from computers having a top level domain of .ru (310). Two potential problems with such a rule are as follows. One, IP addresses 306 and 308 may not actually be mapped using DNS. Two, even if IP addresses 306 and 308 are mapped with DNS (e.g., to badguy1.example.ru and badguy2.example.ru), appliance 102 may not be able to resolve the DNS or to resolve the DNS quickly enough to enforce policy 304.

FIG. 3B illustrates a set of example policies. The example policies shown include geographic information. Rule 312 illustrates an alternate way of preventing access by computers 114 and 116 to the finance department computer 106. As will be explained in more detail below, appliance 102 includes (or is otherwise in communication with) a database of mappings between IP addresses and countries. Instead of specifying an IP address (306) or a top level domain (310) as a source, a source country can be specified (314). Rule 312 will be applied to any of the IP addresses included in database 428 that are designated as having been assigned to computers or network elements in Russia.

Other rules are also included in the set shown in FIG. 3B. As one example, rule 316 will allow computers located in the Singapore office of ACME Corporation (318) to access any of the computers in the engineering lab within the Denver branch office (320), so long as the SSH protocol (322) is used to communicate. As will be described in more detail below, "Singapore-Office" and "Denver-Lab" are examples of custom regions that can be specified and stored for use with appliance 102. Another rule specified in FIG. 3B is rule 324. Specifically, rule 324 prohibits anyone from the country of Iran (326) from sending mail (328) to an ACME mail server (330), such as mail server 104. Which IP addresses correspond to Iranian devices is stored in database 428, and which devices within ACME that are mail servers are also stored by device 102, either as user defined regions, or as another appropriate grouping/object.

Figure 4:
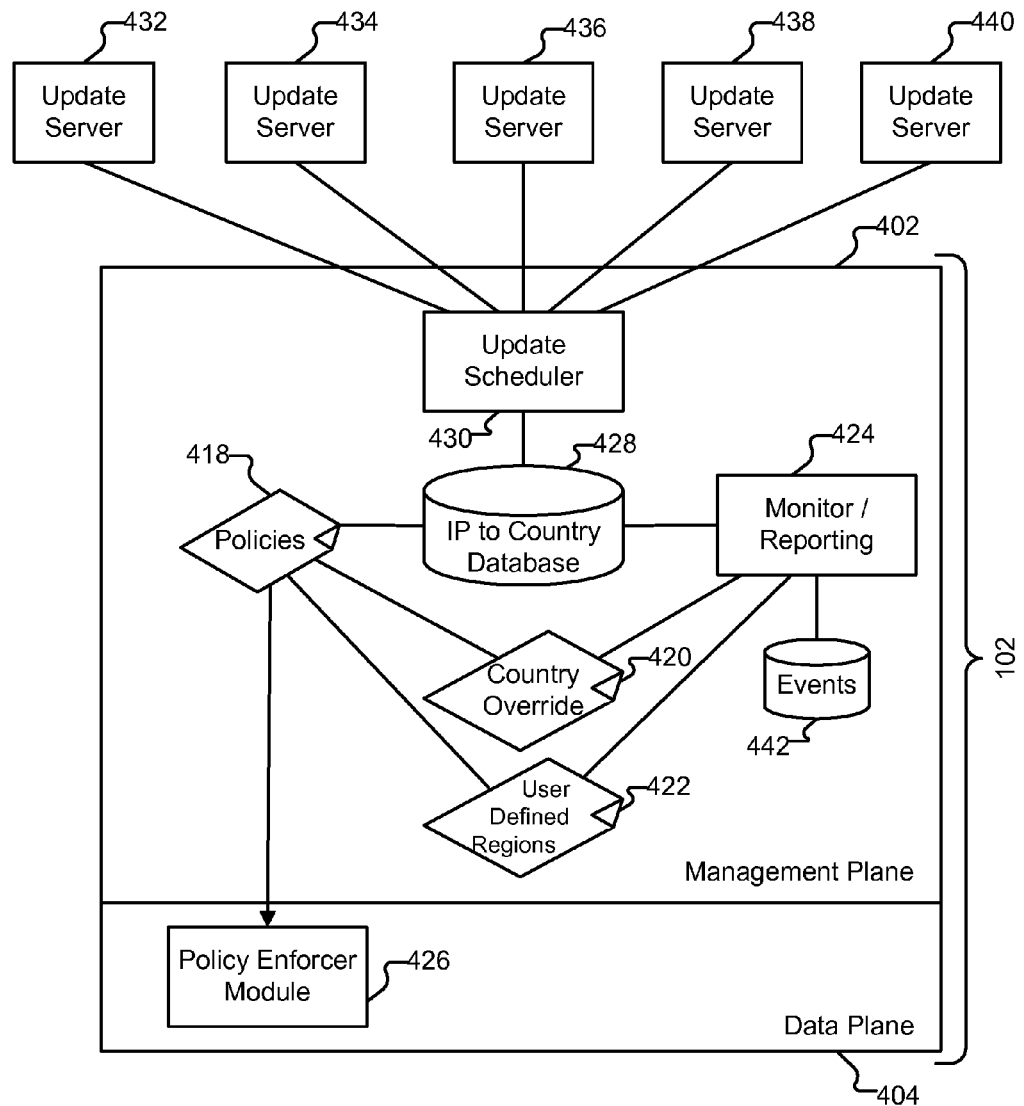
FIG. 4 illustrates an embodiment of a policy enforcement appliance.

FIG. 4 illustrates an embodiment of a policy enforcement appliance. In the example shown, the functionality of policy enforcement appliance 102 is implemented in a firewall. Specifically, appliance 102 includes a management plane 402 and a data plane 404. The management plane is responsible for managing user interactions, such as by providing a user interface for configuring policies (418) and for viewing log data and other reporting information made available by reporting module 424. The data plane is responsible for managing data, such as by performing packet processing and session handling. Additional detail about components of appliance 102 as illustrated in FIG. 4 will now be provided.

Update scheduler 430 is configured to retrieve IP address information from a set of update servers 432-440. Update servers 432-440 are maintained by the entities responsible for issuing IP addresses in their respective regions. One example is update server 432, which is maintained by the American Registry for Internet Numbers (ARIN) and is one of five regional Internet registries. ARIN is responsible for the distribution of IP addresses, including both IPv4 and IPv6 addresses (and ASNs) for the United States, Canada, and various North Atlantic and Caribbean islands. Another example is update server 434, which is maintained by the Réseaux IP Européens Network Coordination Centre (RIPE NCC) and is responsible for the distribution of IP addresses for Europe, the Middle East, and parts of Central Asia. Update server 436 is provided by the Asia Pacific Network Information Centre (APNIC), update server 438 is provided by the Latin America and Caribbean Network Information Centre (LACNIC), and update server 440 is provided by the African Network Information Center (AfriNIC). In some embodiments, other sources of IP assignment information are also retrieved by update scheduler 430, which is configured to either pull information from update servers (or other sources) or to receive the information as a push, as applicable. In some embodiments, updater scheduler receives IP address information from one or more aggregation points which in turn receive information from update servers such as update server 434.

Update scheduler 430 is configured to store the IP address information that it receives in a database that maps a given IP address or range of addresses to a particular country, and vice versa. Additional information, such as the county, state, city, or other geolocation information associated with the IP address is also stored in database 428, if available. The objects stored in database 428 are usable in policies by policy administrators, without those policy administrators needing to specify the contents of those objects.

Update scheduler 430 is also configured to periodically refresh the contents of database 428, such as when the update servers indicate updated information is available, and/or based on a schedule. An administrator of a rule, such as rule 312, need not revise the rule when changes to database 428 are made. The application of the rule to the newly added IP addresses (or the cessation of application of the rule to newly deleted IP addresses) for an implicated country (or region) will occur automatically.

In various embodiments, portions 428 and/or 430 of the appliance shown in FIG. 4 are located outside of appliance 102 and are, for example, provided by the manufacturer of appliance 102 as a service. In an environment in which multiple appliances 102 are included in an enterprise, in some embodiments only one or some other subset of the appliances includes portion 428 (and/or 430), with the other appliances retrieving information from those that have portions 428/430, as applicable. Each of the appliances 102 may have its own set of overrides 420 and user defined regions 422, or those aspects may also be standardized across an organization.

An administrator of appliance 102 can specify override information through an interface provided by appliance 102. Examples of override information include: (1) moving a given IP address (or range of IP addresses) from one country (e.g., Spain) to another (e.g., France) when an error is present in database 428; (2) adding an IP address (or range of IP addresses) that are not currently present in database 428 (e.g., including internal IP addresses belonging to the Singapore office to the country of Singapore); and (3) removing an IP address (or range of IP addresses) from database 428. The administrator can also carve out part of a country IP address assignment to a custom region. For example, an administrator could create a custom region for the external IP addresses assigned to those nodes in the Singapore branch office, removing them from the remaining IP addresses assigned to nodes in Singapore. In various embodiments, override information is stored in file 420 (or another appropriate data structure) without changes being made directly to database 428. When policies are evaluated, the contents of file 420 will take precedence over information stored in database 428.

Appliance 102 also makes available an interface through which user-defined regions may be provided. As with the country override information, the user-defined regions may be stored as a flat file 422 or as any other appropriate data structure, and are usable within policies as objects. When policies are evaluated, the contents of file 422 will take precedence over information stored in database 428. One example of a user-defined region is the lab located in the Denver branch office of ACME Corporation, added through the interface shown in FIG. 5.

Figure 5:
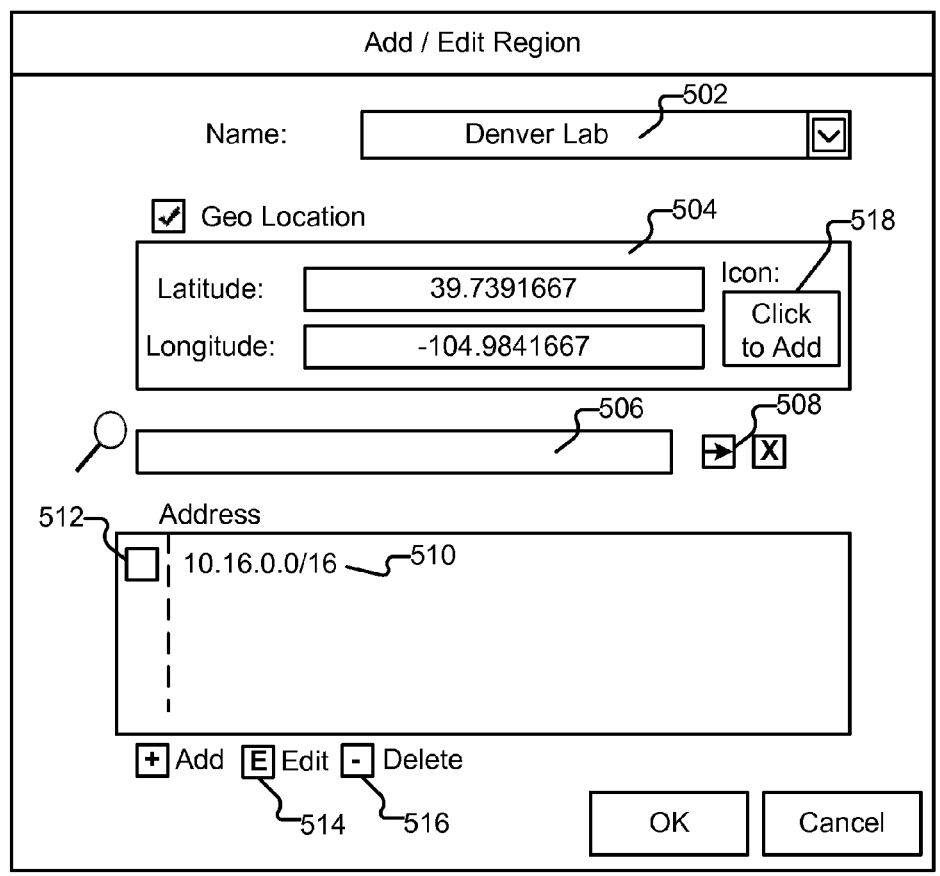
FIG. 5 illustrates an embodiment of an interface through which a custom region can be created and edited.

An embodiment of an interface through which a custom region can be created and edited is shown in FIG. 5. To create a new custom region, an administrator enters a name in box 502 and optionally supplies latitude and longitude information for the region in box 504. As applicable, the administrator can also provide a representative icon, such as a country flag, by interacting with region 518. The administrator can manually enter one or more IP addresses (or ranges of IP addresses) in box 506, and can also search for the appropriate address information by selecting box 508. If desired, the administrator can also edit or delete entries, such as entry 510, by selecting the appropriate box 512 and option (514 or 516). Groups of countries (or user-defined regions) can also be combined into new objects and referred to—such as a group of "European Union nodes;" covering all devices within the specific EU countries, a group of countries to which encryption software may not be exported, and a group of "ACME Corporation external addresses," covering all of the external IP addresses issued to any of the nodes in the Santa Clara, Singapore, or Denver offices of ACME Corporation.

Policy Enforcement

As mentioned above, one of the tasks performed by appliance 102 is the enforcement of policies (e.g., by policy enforcement module 426). Policies (418) stored by appliance 102 can include security policies, intrusion detection policies, quality of service policies, policies based on routing/forwarding, and other types of policies applicable to network traffic and/or network resources. At least some of the policies 418 stored by appliance 102 include geographical information. Examples of such policies are shown in FIG. 3B. Policy definitions can include a country name (314, 326) and/or a user defined region (318), in addition to IP addresses (322). The geographical information can be used as traffic ingress points (324), traffic egress points (326), or both.

When traffic is received by appliance 102, source and destination information is extracted from the flow and used to determine the corresponding geographical information for a potential rule match. In various embodiments, the location information stored in database 428 is made into a lookup table (e.g., a trie), to make lookups by policy enforcement module 426 more efficient. If a rule is matched, policy enforcer module 426 enforces the applicable rule.

Figure 6:
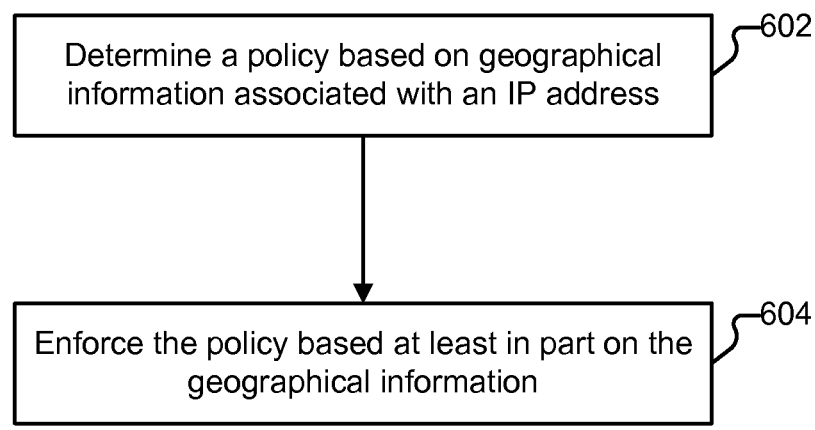
FIG. 6 illustrates an embodiment of a process for enforcing a policy based on geographical information.

FIG. 6 illustrates an embodiment of a process for enforcing a policy based on geographical information. In some embodiments, the process shown in FIG. 6 is performed by appliance 102. The process begins at 602 when a policy based on geographical information associated with an IP address is determined. As one example, when a user of Russian computer 114 attempts to communicate with device 106, the IP address information of computer 114 and its intended destination is extracted by data plane 404. At 602, a rule applicable to the extracted IP address information (and any other applicable information, such as the source/destination user, and the application) is determined. At 604, the rule is enforced. As one example, at 604, if the source of the traffic is determined to be from Russia (as computer 114 is), and the destination is determined to be computer 106, the action taken would be to deny the communication.

Visualization

Events generated by appliance 102 are stored in event database 442 and include traffic flow information. Included in the traffic flow information are the origination and termination IP addresses. The information stored in database 442 can be used to generate a variety of visualizations by monitoring/reporting module 424. In some embodiments, country/region mappings between the source/destination IP addresses are stored in event database 442. In other embodiments, the mappings are determined at the time the visualizations are produced.

One type of visualization is to provide a list of or other visual indicator of the different applications used in conjunction with source (or destination) countries (or regions). For example, using the techniques described herein, an administrator of system 102 is able to determine that 20 devices from Russia are attempting to access computer 106 via a web server that is installed on computer 106. An administrator is also able to determine that one user of computer 104 is engaged in an FTP session with a computer in France. As applicable, additional information, such as country flags or other regional icons, can be included in the various visualizations. Another example of a visualization is one in which data leakage is depicted with respect to geographical information. So, for example, if it is detected that a computer in Nigeria is receiving social security numbers (or that an attempt is being made to transmit credit card numbers to Nigeria), such information can be monitored for and/or depicted in an interface that includes geographical information, such as map data and/or the country flag of Nigeria. Two additional types of visualizations are shown in FIGS. 7 and 8.

Figure 7:
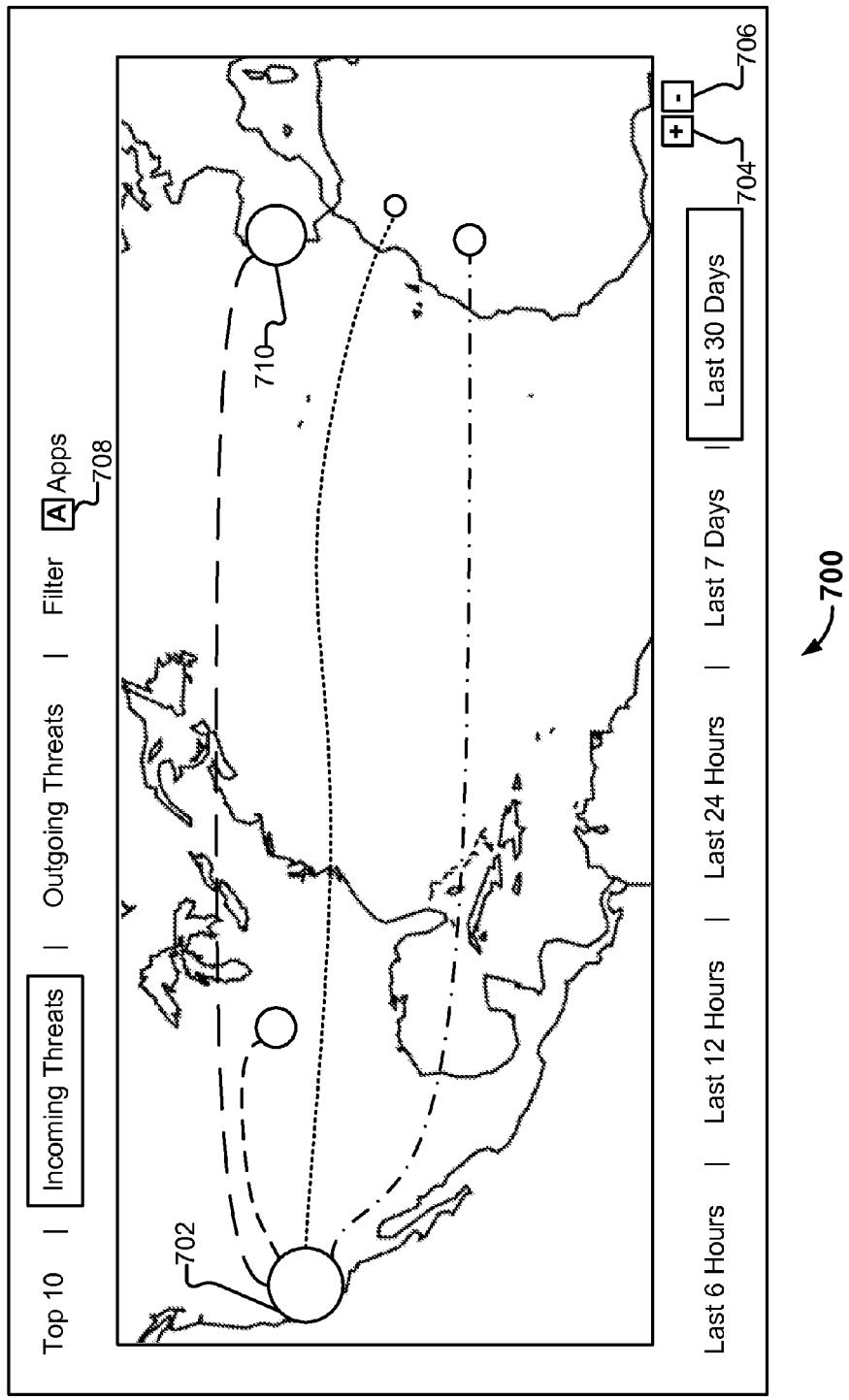
FIG. 7 illustrates an example of a threat visualization that includes geographical information.

FIG. 7 illustrates an example of a threat visualization that includes geographical information. In the example shown, incoming threats to a portion of network 110 are shown. Specifically, incoming threats directed toward the headquarters of ACME Corporation in Santa Clara, Calif. (702) are depicted. (Threats directed toward the Denver and Singapore branch offices are not depicted in this example, but could be included if desired). The majority of threats to network 110 appear to be emanating from Portugal (710), and in particular from Coimbra, as indicated by the size of the spheres. A viewer of interface 700 can zoom in and out of the interface by interacting with buttons 704 and 706. By selecting button 708, a user of interface 700 can also filter what is shown, such as by selecting "application" filter 708. As one example, after selecting filter 708, a user could specify that the visualization be limited to incoming threats that make use of a particular protocol, such as FTP. Other filters can also be applied, such as a all threats vs. successful vs. unsuccessful threats.

Figure 8:
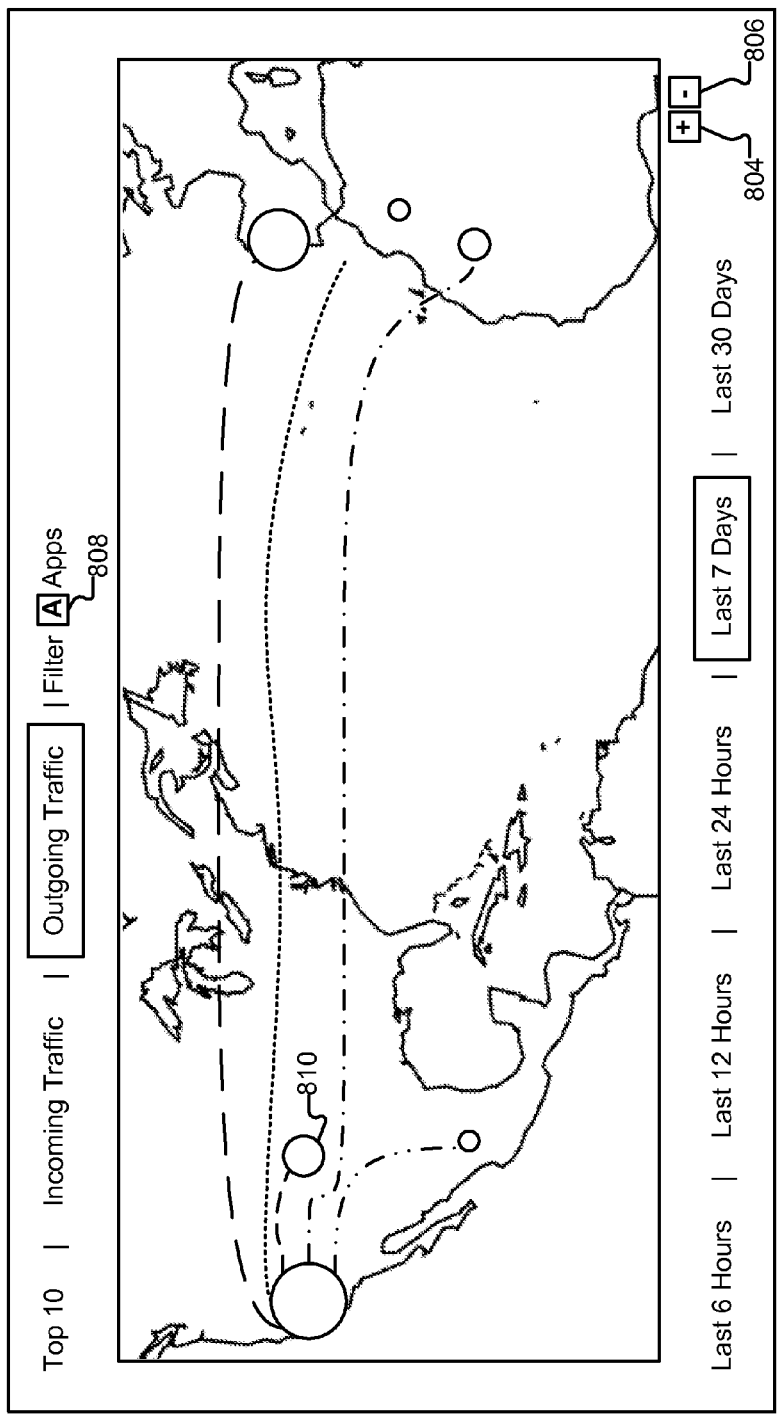
FIG. 8 illustrates an example of a traffic visualization that includes geographical information.

FIG. 8 illustrates an example of a traffic visualization that includes geographical information. In the example shown, outgoing traffic for a portion of network 110 is shown, for the time period of the last seven days. Specifically, outgoing traffic coming from the headquarters of ACME Corporation in Santa Clara, Calif., to various destinations, is depicted. (The outgoing traffic of the Denver and Singapore branch offices is not shown, but could also be included.) If a user of interface 800 clicks on circle 810, the user will learn that one of the destinations of outgoing traffic from ACME's Santa Clara location is the Denver branch office (depicted at 810). This is made possible, in part, because of the latitude/longitude information provided in box 504 for the specification of the Denver lab. As with interface 700, in interface 800, a user can filter what is shown by selecting "application" filter 808 and the map can be zoomed in and out of by using buttons 804 and 806.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   a first interface configured to receive a set of rules to be applied to network traffic, wherein a first rule included in the set of rules includes a first geolocation, and wherein the first geolocation corresponds to at least one of: (1) a country identifier, and (2) an identifier of a user-defined region;
   a second interface configured to receive, from a device having an associated source IP address, a request to access a resource, wherein the resource has an associated destination IP address;
   a processor configured to:
      determine that the first rule should be applied to the request, at least in part by determining that at least one of the source IP address and the destination IP address is present in a first IP address-geolocation mapping stored in a data store; and
      apply the first rule to network traffic associated with the request; and
   a memory coupled to the processor and configured to provide the processor with instructions.

2. The system of claim 1 wherein the processor is further configured to store a mapping between the first geolocation and at least one of the source IP address and the destination IP address in the data store.

3. The system of claim 1 wherein the first geolocation comprises country information.

4. The system of claim 1 wherein the first geolocation comprises a user-defined region.

5. The system of claim 1 wherein the data store comprises latitude and longitude information.

6. The system of claim 1 wherein the first rule comprises a rule associated with an application.

7. The system of claim 1 wherein the first rule comprises a rule associated with a quality of service policy.

8. The system of claim 1 wherein the first rule comprises a rule associated with a routing policy.

9. The system of claim 1 wherein the first rule comprises a rule associated with a security policy.

10. The system of claim 1 wherein the processor is further configured to receive the first IP address-geolocation mapping from a third party.

11. The system of claim 1 wherein the processor is further configured to allow a user to override the first IP address-geolocation mapping.

12. The system of claim 1 wherein the processor is further configured to cause a display of the first IP address-geolocation mapping in graphical interface.

13. The system of claim 12 wherein the graphical interface includes an indication of an application used by a client associated with the source IP address.

14. The system of claim 12 wherein the graphical interface includes an indication of an application used by a client associated with the destination IP address.

15. The system of claim 12 wherein the graphical interface includes an indication of monitored network traffic correlated with the first IP address-geolocation mapping and a threat.

16. The system of claim 1 wherein the processor is further configured to monitor one or more network events and to enforce the first rule based at least in part on the monitored events.

17. The system of claim 1 wherein the first rule includes a specification of a source country.

18. The system of claim 1 wherein the first rule includes a specification of a destination country.

19. A method, comprising:
   receiving a set of rules to be applied to network traffic, wherein a first rule included in the set of rules includes a first geolocation, and wherein the first geolocation corresponds to at least one of: (1) a country identifier, and (2) an identifier of a user-defined region;
   receiving, from a device having an associated source IP address, a request to access a resource, wherein the resource has an associated destination IP address;
   determining that the first rule should be applied to the request, at least in part by determining that at least one of the source IP address and the destination IP address is present in a first IP address-geolocation mapping stored in a data store; and
   applying the first rule to network traffic associated with the request.

20. A computer program product embodied in a non-transitory computer readable storage medium and comprising computer instructions for:
   receiving a set of rules to be applied to network traffic, wherein a first rule included in the set of rules includes a first geolocation, and wherein the first geolocation corresponds to at least one of: (1) a country identifier, and (2) an identifier of a user-defined region;
   receiving, from a device having an associated source IP address, a request to access a resource, wherein the resource has an associated destination IP address;
   determining that the first rule should be applied to the request, at least in part by determining that at least one of the source IP address and the destination IP address is present in a first IP address-geolocation mapping stored in a data store; and applying the first rule to network traffic associated with the request.

* * * * *